No. 672,822. Patented Apr. 23, 1901.
W. L. CALDWELL.
SIDEWALK.
(Application filed Sept. 15, 1900.)
(No Model.)

Witnesses:  Inventor
M. A. Scheuer William L. Caldwell
H. P. Hammond by
Att'ys.

UNITED STATES PATENT OFFICE.

WILLIAM L. CALDWELL, OF NEW YORK, N. Y., ASSIGNOR OF TWO-THIRDS TO JOHN W. RAPP AND HENRY LOY EASTON, OF SAME PLACE.

SIDEWALK.

SPECIFICATION forming part of Letters Patent No. 672,822, dated April 23, 1901.

Application filed September 15, 1900. Serial No. 30,119. (No model.)

*To all whom it may concern:*

Be it known that I, WILLIAM L. CALDWELL, a citizen of the United States, residing at New York, in the county and State of New York, have invented certain new and useful Improvements in Sidewalks, of which the following is a specification.

This invention relates to improvements in sidewalks; and its object is to provide a sidewalk composed of a cement body with a sheet-metal support, the latter being sufficiently yielding to permit of its expansion and contraction under changes of temperature without fracture due to the rigidity of the cement, while at the same time affording sufficient vertical support.

My invention also provides for a luminous or lighted construction, the structure being channeled, with comparatively thin portions for the reception of the glass lights or blocks and heaviest intermediate portions for support.

Figure 1:
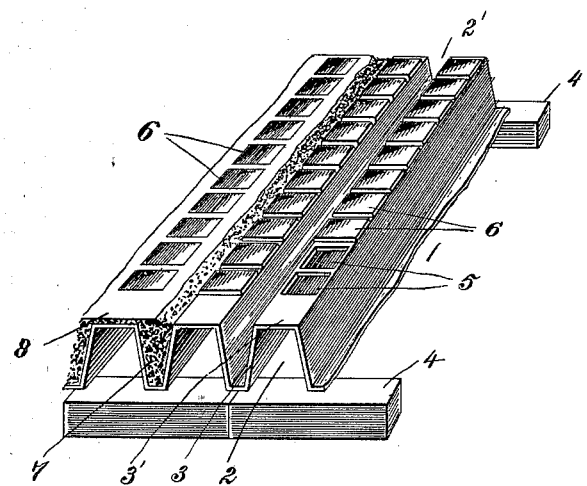
Figure 2:
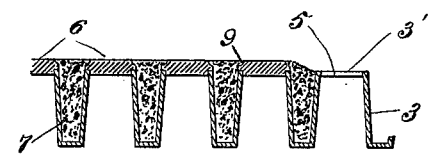
Figure 3:
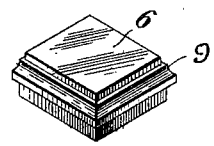

In the accompanying drawings, Figure 1 is a perspective view of a portion of the improved pavement. Fig. 2 is a vertical section thereof. Fig. 3 is a detail view of one of the lights.

The construction comprises a plate or sheet-metal support or form 1, with parallel corrugations, so as to form channels 2 2' in opposite sides with intermediate flat or plane portions 3 3'. This sheet-metal support or form is placed with its ends resting on the bases or substructures 4 of the pavement, with the corrugations extending longitudinally across from one base 4 to the other. In the flat portions 3' at the top are provided apertures 5, of any suitable shape, for the reception of lights or glass blocks 6, of corresponding shape, such blocks being preferably provided with a lower part fitting in such apertures and with an upper extension of larger size extending over the form 1 sufficiently to support the block. These lights having been put in place, the form 1 is covered with cement 6, filling all the upturned channels 2' and covering the upper flat portions 3' to the level of the top of the lights. This results in a construction consisting of longitudinal girders or stringers 7, of cement, supported and contained by the troughs or channels 2' of sheet metal, and intermediate comparatively thin web portions 8, including the upper flat portions 3', the superimposed cement, and the lights 6. The under channels 2 then serve as passage-ways for the light passing through the glass blocks.

Owing to the yielding nature of the sheet-metal support or form 1 it is not so liable to crack the cement or to be itself disrupted by the strains due to expansion or contraction of the metal. The depth of the channels may be made sufficient to give a contained girder of cement of sufficient height to withstand with the support furnished by the nearly-vertical sides of the channel any required load. A great advantage of my improved construction is that it dispenses with the use of any false work for centering or bridging, the part 1 serving first as a mold or form for the cement and afterward as a support to aid in sustaining the weight. The portions 3 of the plate or form 1 that form the bottoms of the channels 2' are flat or plane, so as to form flat bearing-surfaces adapted to rest directly on the side bearing-supports and take the weight of the structure without any distortion or bending such as would occur with a rounded bearing-surface. Moreover, this flat bottom portion 3 where it meets the plane substantially vertical portions which form the sides of the channels 2' forms decided angles, which resist any tendency of the cement to creep or slide on the form 1 laterally during the changes of load, and therefore serve to maintain the integrity of the structure, which is essential to strength and durability. The top faces of the plate or form 1 where they meet the plane sides of the channels also form angles resisting any creeping tendency. With a rounded bottom or support the tendency of the cement to creep thereon during changes of load is only resisted by the adhesion of the cement and is liable to exceed the adhesive capacity of the structure, loosening the cement from the support and weakening the structure, so as to render it useless and dangerous. The substantial or approximate verticality of the side walls of the channels is also of importance, as it enables the cement to obtain such a hold on the support and is accompanied with such slight flexions under changes of load that the cement is enabled to retain its adhesive grip under all reasonable changes of load, and a permanent practically inseparable structure is produced without the use of cross stays or ties or special supporting-saddles. If the cement-receiving channels were made to flare upwardly at a very decided angle, the amount of distortion produced on even moderate changes of load would be sufficient to part the cement from the support, and this effect would be heightened if accompanied by a rounded conformation of the channel, for the reasons above stated. It has been proposed to avoid such separation of the parts by making the channel dovetailed; but in that case the construction is mechanically bad, as it brings the minimum thickness of cement at the neutral axis—that is, about half-way between the bottom and top of the cement, where splitting of the cement is most likely to occur. The best construction mechanically is that in which the cement beams taper upwardly, so as to permit the maximum thickness in the compressive portion, and by my invention I obtain such a construction by a slight upward flare without departing from the vertical sufficiently to cause the cement and metal support to part on changes of load, as aforesaid. While the lights 6 are held by the under side projections in the holes in the top of the form 1 sufficiently to retain them in place during the cementing operation, it is the cement itself that finally holds them in position. This is of advantage, in that the thermal expansion of glass and cement being about equal a tight joint is maintained, obviating the liability to leakage or loose lights. The top of the light 6 is beveled on the edges, as shown at 9, so that when the cement is in place it serves to hold the glass more firmly.

What I claim as new, and desire to secure by Letters Patent, is—

1. A sidewalk construction, comprising a sheet-metal form, shaped with channels above and below, said channels having plane sides which are substantially vertical but with a slight upward flare and flat bearing-faces at the bottom of the channels, forming angles with the plane sides, and cement filling in the channels on the upper side, forming girders.

2. A sidewalk construction, comprising a sheet-metal form, shaped with channels above and below, said channels having substantially vertical plane sides but with a slight upward flare, and flat faces both above and below, between the channels, forming angles with the plane sides, and cement filling in the channels on the upper sides, forming girders.

3. A sidewalk construction, comprising a sheet-metal form shaped with channels above and below, with flat portions, between the channels on the upper side, provided with apertures, lights in said apertures and extending above same, and cement filling in the channels on the upper side, extending over said flat portions between the lights, so as to be substantially flush with the lights, the bottoms of the lower channels being provided with flat bearing-faces, and the cement-receiving channels having substantially vertical sides with a slight upward flare.

WILLIAM L. CALDWELL.

Witnesses:
A. P. KNIGHT,
J. GREEN.